United States Patent [19]

Watanabe et al.

[11] 4,174,067
[45] Nov. 13, 1979

[54] IRRIGATION SYSTEM

[75] Inventors: Sohsuke Watanabe; Masahiro Metsugi, both of Shimodate, Japan

[73] Assignee: Hitachi Chemical Company, Ltd., Tokyo, Japan

[21] Appl. No.: 815,779

[22] Filed: Jul. 14, 1977

[30] Foreign Application Priority Data

Jul. 23, 1976 [JP] Japan .................................. 51/88354

[51] Int. Cl.² ............................................. B05B 15/02
[52] U.S. Cl. ..................................... 239/112; 239/542; 239/547
[58] Field of Search ............... 239/112, 113, 110, 111, 239/145, 542, 547, 450

[56] References Cited

U.S. PATENT DOCUMENTS

| 1,778,551 | 10/1930 | Etnyre ................................. 239/112 |
| 3,587,972 | 6/1971 | Weeth ............................... 239/450 X |
| 3,662,955 | 5/1972 | Takanashi ........................... 239/145 |
| 3,840,182 | 10/1974 | Geffroy ............................... 239/145 |

Primary Examiner—John J. Love
Attorney, Agent, or Firm—Stevens, Davis, Miller & Mosher

[57] ABSTRACT

An irrigation system including liquid passage means made of a plastic pipe having very small slit openings for discharging liquid therefrom, further including means for selectively supplying compressed air into the liquid passage means for occasionally blowing off the very small slit openings when they have been clogged.

1 Claim, 2 Drawing Figures

IRRIGATION SYSTEM

BACKGROUND OF THE INVENTION

The present invention relates to an irrigation system, and, more particularly, an improvement of an irrigation system which continuously supplies water or other liquid to plants or vegetables at a very low rate.

Recently, modern agriculture more often employs an irrigation system adapted to supply water or other liquid such as liquid fertilizer to the root portions of plants or vegetables at a low but continuous rate in the form of droplets of mist in consideration of conservation of water resources and the desireable effect of continuous moistening enjoyed by most plants and vegetables. The conventional irrigation system for this purpose generally comprises a source means of pressurized liquid such as a pump, a head tank, etc. and passage means such as a pipeline system for conducting liquid from said source means to individual irrigation spots, wherein the passage means have small openings for discharging liquid therefrom. In this irrigation system, any desired low rate of continuous supply of liquid will be available by judiciously designing said small openings so that they have a certain required throttling effect. However, since such small openings must generally be greatly throttled so that the overall liquid supply rate remains at a certain necessary minimum value under the condition of continuously operating of the irrigation system, this system has the problems that it is very difficult and expensive to obtain such very small openings having a certain correct required throttling ratio on the one hand and that the very small openings are very liable to blocking or clogging on the other hand.

SUMMARY OF THE INVENTION

It is the object of the present invention to provide an improved irrigation system for continuously supplying liquid at a very low supply rate to individual irrigation spots such as the root portions of plants or vegetables which is simple in structure, low in construction costs, and yet has a highly accurate throttling ratio and is able to operate for a long period of service without causing permanent blocking of the small openings for discharging irrigation liquid.

In accordance with the present invention, the above-mentioned object is accomplished by providing an irrigation system comprising a source means of pressurized liquid, passage means for conducting liquid from said source means to individual irrigation spots, said passage means including a plastic pipe having very small slit openings for continuously discharging liquid therefrom, a source means of compressed air connected to said passage means, and an operational control means for temporarily stopping supply of said pressurized liquid and for supplying compressed air from said source means of compressed air to said passage means.

BRIEF DESCRIPTION OF THE DRAWING

The present invention will become more fully understood from the detailed description given hereinbelow and the accompanying drawings which are given by way of illustration only and are thus not limitative of the present invention and wherein.

DESCRIPTION OF THE PREFERRED EMBODIMENT

Figure 1:
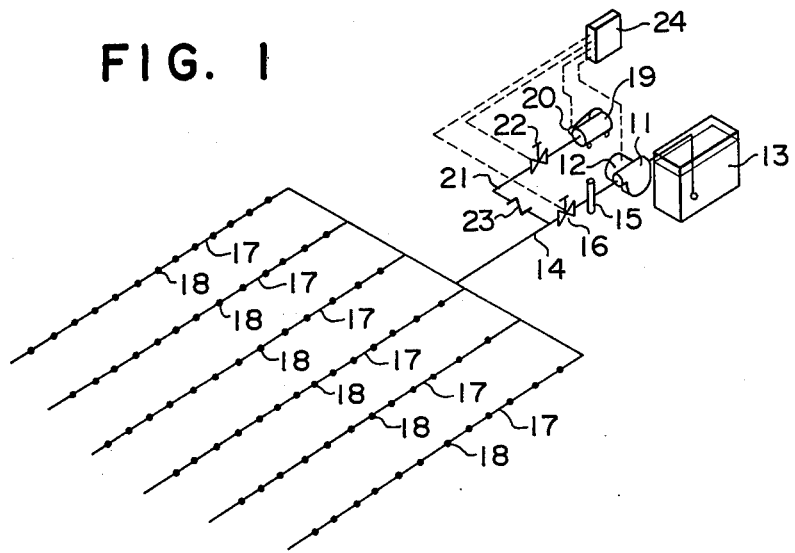
FIG. 1 is a diagrammatical perspective view showing an embodiment of the irrigation system of the present invention.

Referring to FIG. 1, an embodiment of the irrigation system of the present invention is shown by a diagrammatic perspective illustration. In the figure, 11 designates a pump driven by an electric motor 12 which draws up irrigation liquid such as water from a reservoir 13 and delivers pressurized liquid to a pipe 14. At a middle portion of the pipe 14 are provided a filter 15 and a control valve 16. Pipe 14 is connected with a number of branch pipes 17 made of plastic piping each having a number of very small slit openings diagrammatically designated by points 18 for continuously discharging liquid therethrough.

19 designates an air compressor driven by an electric motor 20. The compressed air delivery port of the compressor is connected with the pipe 14 by means of a pipe 21 including a control valve 22 and a check valve 23 incorporated at a middle portion thereof. 24 designates a controller provided for controlling operation of pump 11, the air compressor 19 and control valves 16 and 22, in a manner as described hereinbelow.

Figure 2:
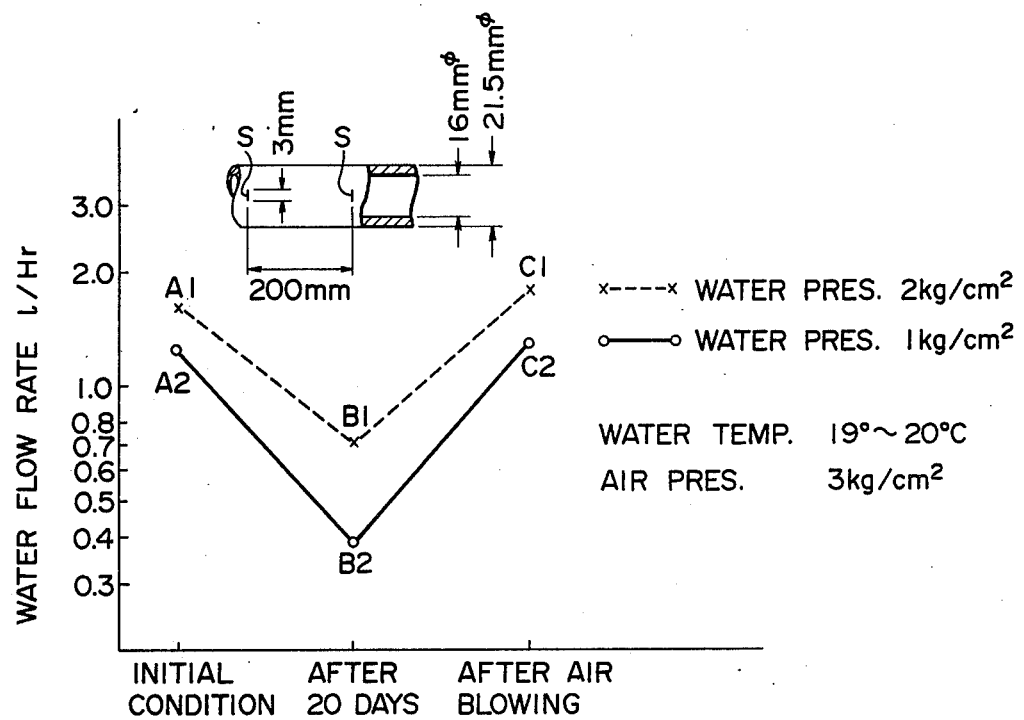
FIG. 2 is a diagram showing an example of the performance of the irrigation system of the present invention.

In operation, the pump 11 is generally constantly operated to supply pressurized liquid continuously to the pipe 14 and the branch pipes 17. The pressure of the pressurized liquid may generally be of the order of 1–2 $Kg/cm^2$. The very small slit openings 18 such as the slits S shown in FIG. 2 are designed to have a certain high throttling effect so as to provide a required distribution of irrigation as well as a required rate of irrigation on a continuous supply basis. In this normal operation, the control valve 16 is of course opened while the control valve 22 is closed and the air compressor 19 is shut down.

After a period of continuous irrigating operation of the system, if the very small slit openings 18 have undergone a certain clogging, the irrigating operation of the system is temporarily stopped by shutting down the pump 11 and closing the control valve 16. Thereafter the air compressor 19 is started while the control valve 22 is opened whereby compressed air is supplied through the pipe 14 and the branch pipes 17 so as to let the compressed air be discharged through the very small slit openings 18. The pressure of the compressed air should preferably be a little higher than that of the irrigation liquid so as to be of the order of 3 $Kg/cm^2$. By this discharge of compressed air through the very small slit openings 18, substances clogging the very small slit openings are effectively removed while the slit openings are temporarily slightly magnified within the limit of the elastic deformation of the plastic material. Thus the irrigation system resumes its fresh operating performance.

FIG. 2 shows some examples of evaluation of performance of the irrigation system of the present invention. A polyethylene pipe of 80 meters length and having diametric dimensions as shown in FIG. 2 was provided with cutting slits S of 3 mm length and 200 mm spacing and used as the passage means having very small slit openings such as the branch pipes 17 in FIG. 1. In the diagram of FIG. 2, point A1 shows the flow rate of water discharged by the pipe when pressurized water of the pressure of 2 $Kg/cm^2$ and the temperature of 19°–20° C. was supplied to the pipe. After 20 days operation the flow rate of water lowered to point B1. Then, the blowing off of the cut slits was performed by supplying compressed air of the pressure of 3 Kg/cm$^2$ to the pipe for 10 minutes. By this blowing-off operation, the flow rate of water increased to point C1. Points A2, B2 and C2 are the results of another experiment performed with respect to a similar pipe while changing the water pressure to 1 Kg/cm$^2$. From these results, it will be understood that the clogging of the very small slit openings is clearly removed by the blowing-off operation by compressed air, particularly of a little higher pressure than the irrigation liquid. In this connection, the fact that the points C1 and C2 are positioned higher than the points A1 and A2 respectively is construed to be the effect of a little enlargement of the slit openings due to a plastic deformation thereof caused by a period of operation.

Although the invention has been shown and described with respect to a preferred embodiment thereof, it should be understood by those skilled in the art that various changes and omissions of the form and detail thereof may be made therein without departing from the scope of the invention.

We claim:

1. An irrigation system comprising:
   a first source means for pressurized liquid, which comprises a pump and supplies irrigating liquid at a predetermined first pressure;
   passage means for conducting said irrigating liquid from said source means to individual irrigation locations, comprising a plastic pipe having very small enlargeable slit openings on its outside surface extending through to its interior and lying transverse to its longitudinal direction, for continuously discharging liquid therefrom;
   a second source means for compressed air, which comprises a compressor and supplies compressed air at a predetermined second pressure which is substantially higher than said first pressure;
   and an operational control means, which comprises a first control valve which controls a connection of said first source means for pressurized liquid and said passage means, and a second control valve which controls a connection of said second source means for compressed air and said passage means; and which opposedly operates said first and second control valves, so that when one is opened the other is closed, and which temporarily stops supply of said pressurized liquid from said first source means to said passage means while supplying compressed air from said second source means to said passage means.

* * * * *